United States Patent [19]

Teitel

[11] 4,145,269
[45] Mar. 20, 1979

[54] MULTI-STEP CHEMICAL AND RADIATION PROCESS FOR THE PRODUCTION OF GAS

[75] Inventor: Robert J. Teitel, Ann Arbor, Mich.

[73] Assignee: Texas Gas Transmission Corporation, Owensboro, Ky.

[21] Appl. No.: 682,673

[22] Filed: May 3, 1976

Related U.S. Application Data

[63] Continuation-in-part of Ser. No. 416,999, Nov. 19, 1973, abandoned.

[51] Int. Cl.² .............................................. B01J 1/10
[52] U.S. Cl. ............................................ 204/157.1 H
[58] Field of Search ............................... 204/157.1 H

[56] References Cited
PUBLICATIONS

Steinberg, Advances in Science & Technology, vol. 1, (1962), pp. 309, 312 & 313.

Primary Examiner—Howard S. Williams
Attorney, Agent, or Firm—Laurence R. Brown

[57] ABSTRACT

Heat and neutron energy preferably obtained by a fusion reaction is used to derive CO from $CO_2$ and to process it with water for obtaining $H_2$. Thus, a two-step chemical process uses both heat and radiation energy, and segregates chemical action in separate stages where it is easier to process and separate the output products. Neutron radiation from a fusion reaction is separated in a central chamber through which the radiation passes, thereby isolating the process from nuclear fuel fragments.

7 Claims, 1 Drawing Figure

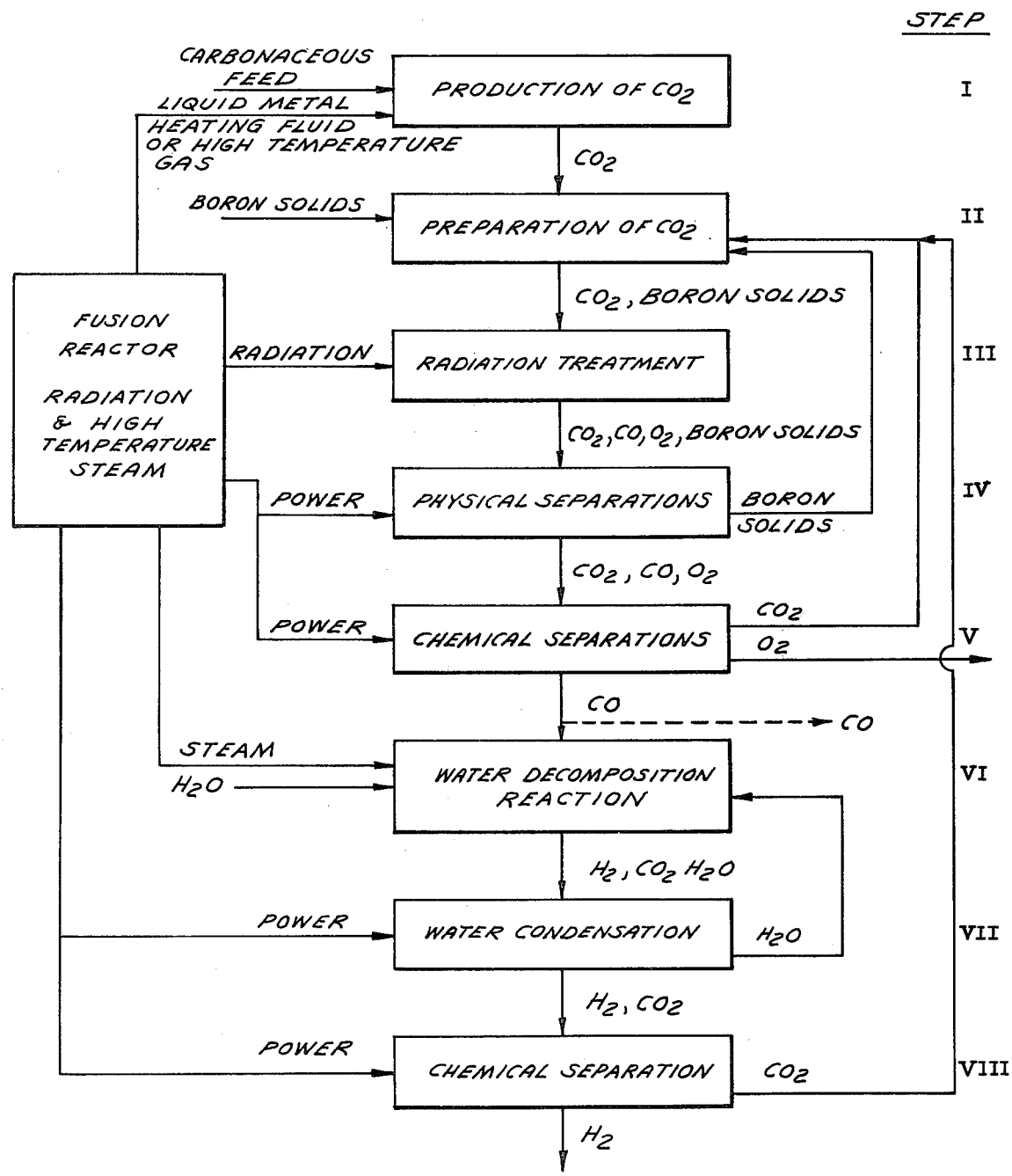

MULTI-STEP CHEMICAL AND RADIATION PROCESS FOR THE PRODUCTION OF GAS

This is a continuation-in-part of Ser. No. 416,999 filed Nov. 19, 1973, now abandoned.

This invention relates to a multi-step chemical and radiation process for the production of combustible fuel gas, and more particularly to the production of carbon monoxide and hydrogen by the combining of radiolytic and chemical reactions in a particular sequence to obtain a final product.

BACKGROUND OF THE INVENTION

High density neutron radiation has been successfully achieved by ignition and burn of fusion fuel such as, for example, deuterium-tritium in pellet form. A preferred source of ignition energy is provided from a laser used with particular pellet configurations which will make it possible to achieve nuclear fusion ignition and burn in a reaction chamber. Patents which illustrate generally the apparatus which can be used in this type of system are:

Whittlesey 3,378,446 — Apr. 16, 1968
Daiber 3,489,645 — Jan. 13, 1970
Hedstrom 3,762,992 — Oct. 2, 1973

Neutron energy of the order of $8 \times 10^5$ to $5 \times 10^7$ neutrons per pellet have been obtained by such fusion devices by at least two organizations, namely Lawrence Livermore Laboratory and KMS Fusion, Inc. This has been widely reported and experimental evidence is set forth in the publication "Laser Focus", September, 1975, pages 39ff. and is evidence of current availability of neutron radiation obtained from fusion reaction.

Fission fragments derived from the nuclear fissioning of U-233, U-235 or Pu-239 have been used as an energy source in the prior art for the decomposition of $CO_2$ materials to produce carbon monoxide and hydrogen for example.

When the fission nuclear reaction is used as the radiation source, materials must be exposed directly to radioactive fission fragments within the reactor assembly or chamber in order to obtain effective energy transfer and this also may require that the material be exposed to uranium or plutonium fuel directly. In some instances, the use of uranium oxide dust or glass fibers containing uranium in intimate contact with the reactants is recommended. (See *Advances in Nuclear Science & Technology*, Vol. 1, Edited by Henley and Kouts, Academic Press, 1962, P. 298ff.) The result is a rather severe contamination of the products by radioactive fission fragments and possibly by the fuel particles themselves. Direct exposure is necessary since about 80 per cent of the fission energy is transported as energetic fission fragments.

It has also been found that there are problems in the use of finely divided fissionable fuel in connection with the dissociation process. The finely divided material is absolutely essential to permit the fission product radiation to escape the fuel particle into the decomposable medium. Experiment has established that the fine fuel particulate may adhere to reactor walls, sometimes in clumps, thus interfering with the safe operation of a fission nuclear reactor. The segregation changes the arrangement of nuclear fuel and may cause thermal hot spots which can destroy containment walls.

OBJECTS OF THE INVENTION

It is therefore an object of the present invention to utilize a combination process, chemical and radiolytic, which avoids direct exposure to fission fragment radiation.

It is another object of the present invention to provide a combination of processes, chemical and radiolytic, which increase the efficiency of the use of radiation energy and decreases radioactive contamination in the production of gaseous fuels such as carbon monoxide and hydrogen.

A further object is to use heat and neutron radiation from fusion reactions efficiently in radiolytic chemical processes.

Other objects and features of the invention will be apparent in the following description and claims wherein the principles of the invention and the use thereof, together with the best mode presently contemplated for the practice of the invention, are set forth.

THE DRAWING

A drawing accompanies the disclosure illustrating diagrammatically the apparatus for the process and the progressive steps of the procedure.

BRIEF DESCRIPTION OF THE INVENTION

In thermonuclear deuterium-tritium fusion of D-T, 80 per cent of the energy is released as fast neutrons and the remaining 20 per cent of the energy is released as alpha and X ray radiation. In the fusion reaction, the material to be processed may be exposed directly in the fusion reaction chamber but preferably is exposed while being confined in a separate container. The latter condition is particularly appropriate for the neutron exposure since the neutrons have an effective penetration characteristic and thus will pass through the walls of a central fusion reaction chamber.

Thus, the use of fusion devices, with the resulting high energy neutrons, as well as alpha and X rays, allows for the direct interaction of the radiation with chemical reactants held in an external vessel and thus isolated from the fusion chamber thereby causing very little problem with contamination. This difference alone is extremely significant in considering the use of nuclear reactors for chemonuclear processing.

In brief, the specific exemplary process afforded by this invention includes formation of carbon dioxide from carbonaceous materials utilizing reactor heat and the exposure of chemicals such as carbon dioxide gas to reactor radiation such as neutron radiation, preferably that obtained from a fusion reaction chamber that is transparent to neutron radiation, alpha or X radiation to permit processing of the chemicals outside the central fusion reaction chamber, thereby to dissociate the chemicals such as $CO_2$ into constituents such as carbon monoxide and oxygen. Carbon monoxide is reacted with water to produce hydrogen which can be used as a gaseous fuel or can be combined with other chemicals to form hydrogen base fuels such as methane.

It is known in the field of radiochemical reactions and processes such as that shown in the aforesaid Henley and Kouts publication that decomposition of carbon dioxide to carbon monoxide is a relatively efficient radiolytic action. Thus carbon dioxide is a material having high G value. Yields of carbon monoxide between 5-20 molecules of CO/100 ev. have been reported (see Henley & Kouts reference) giving efficiency of energy conversion between 15 and 59%.

The present invention contemplates in a preferred embodiment an efficient process where both the heat and radiation from a laser driven fusion process is employed for the achievement of a combined radiolytic and thermochemical process. The process will be described in conjunction with the accompanying drawing where the steps are indicated by roman numerals. It will be appreciated that the materials being handled may be readily contained in available retorts, vessels, and containers made of corrosion resistant materials such as steel.

DETAILED DESCRIPTION OF THE INVENTION

The fusion reactor shown in block form in the drawing is of characteristic design such as shown in the referenced patents and publications wherein heat and power may be derived from the reactor in the form of steam, steam driven generators, heat driven refrigeration cycles and so forth.

Steps I and II are concerned with the production of carbon dioxide for radiolytic decomposition by means of thermal energy derived preferably from the fusion reaction. Thus, in vessel I a carbonaceous material such as limestone, sea shells, oil or coal, can be introduced and heated outside the reactor by means of heat transfer from a liquid metal or high temperature gas circulated by a heating fluid transfer system. Carbon dioxide is separated from the gases produced in vessel I and transferred to vessel II where boron solids are introduced for the purpose of enhancing the radiolytic action of neutron radiation.

Vessel II also receives recirculated carbon dioxide from later phases of the process as will be described. The addition of absorber or radiation converters such as boron or lithium, which converts neutron energy to alpha radiation, will materially increase the carbon monoxide yield. Another possible additive may be a dilution agent such as $NO_2$ to retard recombination of the radiolysis products, as in the case of $CO_2$ radiolysis.

Step III involves providing a vessel III, shown diagrammatically, to receive radiation from the fusion reactor. This may be a jacket surrounding the fusion reaction chamber for example, into which the neutron radiation passes. The carbon dioxide gas and boron solids can be circulated through such an encompassing chamber to be exposed to neutrons and alpha and X radiation. It is preferred to avoid passing the carbon dioxide into the reaction chamber where it may be mixed with fusion fuels which are preferably isolated for simpler recovery processing. It may be desirable to utilize carbon dioxide in a neutron moderation zone of the reactor where fast neutrons are slowed to thermal energy. Carbon dioxide can there be used with the dual function as a moderator and a radiation energy absorber. Carbon dioxide is also used as a coolant to extract thermal energy for producing thermal energy in this process such as by heating of Step I.

Step III will produce, by the radiolytic action of carbon dioxide, the gases, carbon dioxide, carbon monoxide, oxygen and $NO_2$ and remaining boron solids. The Step IV will effect the separation of solid products and return boron solids to vessel II for recycling use. In Step V, low temperature distillation may be one method of separating carbon dioxide, carbon monoxide, $NO_2$ and oxygen. Other established chemical methods may be used to produce the output gases from vessel V. The carbon dioxide from vessel V may also be recycled to vessel II leaving the carbon monoxide product as an output product that may be drawn off and used as a fuel or further processed.

Preferably, a thermochemical reaction of carbon monoxide and water using thermal energy from the fusion reaction will produce hydrogen as the output gaseous fuel base.

The process proceeds as follows:

$$CO + H_2O \rightarrow CO_2 + H_2$$

Heat to initiate this reaction is supplied by steam formed as a part of the fusion reactor complex to efficiently use both radiation and heat energy. This reaction will take place in vessel VI, to which feed water is introduced and mixed with any recirculated water or steam obtained as from vessel VII. The products in vessel VII are hydrogen, carbon dioxide and residual water which can be condensed and returned to vessel VI thus separating out gaseous $H_2$ and $CO_2$.

Step VIII again involves a separation process wherein refrigeration (cryogenics) can be utilized to separate hydrogen from $CO_2$ as the desired end product. Water can be condensed out and hydrogen can be separated from carbon dioxide by diffusion or the low temperature distillation methods. The carbon dioxide can also be returned to vessel II for recirculation and reuse.

After Step V, CO may be removed for the production of methane or other fuels by reaction with hydrogen from Step VIII or otherwise used as fuel. Any CO removed must be replenished by the supply of $CO_2$ to Step I. If CO is not removed from the system, Step I is only necessary to produce start up supplies of $CO_2$ and minimal system losses.

A further refinement of the process involves more complex chemistry but may reduce the steps and thus the complexity of the process. In this refinement, water in the form of steam may be introduced into the carbon dioxide — boron particle feed either just before or just after the exposure to radiation at Step III in the drawing. The gas mixture that will result is carbon monoxide, carbon dioxide, oxygen, water and boron particles, if the carbon monoxide and water do not react; or carbon dioxide, hydrogen, oxygen and water and boron particles, if the reaction takes place.

Assuming no carbon monoxide — water reaction, then, as above described, the water is condensed removing the boron particles with it. The water is recycled. The next step is a cryogenic separation by distillation or solidification of carbon dioxide and oxygen, leaving carbon monoxide. Carbon monoxide is reacted with water to produce hydrogen as described above.

If carbon monoxide and water react at or about the radiation exposure, then the next step will be to remove hydrogen by diffusion through a metal membrane especially pervious to hydrogen, followed by cryogenic removal of carbon dioxide, leaving oxygen. The carbon dioxide and water are then recycled.

As a further modification the separation of hydrogen may be accomplished more efficiently by the use of glass microspheres which are available commercially. They can be readily dispersed in a stream of carbon dioxide containing a water scavenger, in the form of water vapor or droplets. The boron or lithium contained in the glass absorb neutrons and generate a highly ionizing radiation which will escape the thin glass walls thus decomposing carbon dioxide without destroying the microspheres. The product carbon monoxide reacting with the scavenger water results in the formation of hydrogen which is mixed with the oxygen generated by the decomposition of carbon dioxide.

The diffusion rate of hydrogen through the walls of the microspheres is sufficiently rapid that the hydrogen would diffuse into the cavity of the microspheres and thus be physically separated from the oxygen to prevent recombination. The microspheres can then be physically removed and by reduction of exterior pressure, the hydrogen can be extracted by reverse diffusion. Alternately, the oxygen can be extracted from a chamber containing the microspheres and the environmental pressure reduced to achieve the reverse diffusion and recovery of hydrogen.

Thus the fusion reaction cycle combined with the radiolytic and thermochemical reactions involving carbon dioxide and water provides a highly efficient system for the production of gaseous fuels, it being possible to derive the necessary heat and radiation energy from the same source to achieve the desirable result with a very efficient system which conserves the starting materials and utilizes the readily replacable feed material in the form of water.

What is claimed is:

1. An improved process of utilizing radiation and heat from a fusion reaction taking place in a central chamber to derive a desired chemical product from an expendible material which gives a low yield of the desired product when exposed to said radiation, which comprises:
    (a) selecting a first feed material different from said expendible material which feed material has a high G value that upon exposure to said radiation forms a chemically active part and by-product;
    (b) selecting said expendible material as a second feed material having a separable part containing the desired product and a second separable part reactable with the chemically active part to replace the by-product of the first feed material;
    (c) confining said first feed material in a separate container from the central chamber located to receive neutron radiation from said fusion reactor and thereby subjecting it to a high density neutron radiation from said reaction in a radiolytic reaction to liberate said chemically active part; and
    (d) combining said chemically active molecule with said second feed material in a thermochemical reaction fueled by said heat to liberate the desired product and thereby reform the first feed material.

2. A process of forming a chemical product which comprises:
    (a) exposing a carbonaceous feed material to heat from a fusion reaction to form carbon dioxide;
    (b) exposing that carbon dioxide to radiation from said fusion reaction to dissociate into carbon monoxide and oxygen; and
    (c) separating said dissociated products to render the carbon monoxide available.

3. A process as defined in claim 2 in which the carbon monoxide is reacted with water in a thermochemical reaction in the presence of heat from said fusion reaction to produce carbon dioxide and hydrogen, and separating said products to render the hydrogen available as said chemical product.

4. A process as defined in claim 3 in which a plurality of glass microspheres are introduced into a stream of hydrogen to permit diffusion of hydrogen into said microspheres, and said microspheres are then treated to remove said hydrogen.

5. A process of forming hydrogen which comprises:
    (a) providing carbon dioxide;
    (b) exposing that carbon dioxide to radiation and heat in the presence of water to dissociate said carbon dioxide into carbon monoxide and oxygen and simultaneously to drive a thermochemical reaction between carbon monoxide and water to form hydrogen and carbon dioxide; and
    (c) separating said hydrogen from carbon dioxide to render hydrogen available as an output product.

6. The process defined in claim 5 including the steps of forming a reaction producing heat and alpha, neutron and X-ray radiation, and using both said heat and radiation therefrom in said process step (b).

7. The process defined in claim 6 wherein the last mentioned reaction is a fusion reaction, whereby said output product is derived without substantial radioactive contamination.

* * * * *